(12) United States Patent
Miller

(10) Patent No.: US 6,246,655 B1
(45) Date of Patent: Jun. 12, 2001

(54) PROGRAMMABLE SELF-OPERATING CADDY-LOADED COMPACT DISK DUPLICATION SYSTEM

(76) Inventor: David Miller, 1590C Solano Way, Concord, CA (US) 94530

( * ) Notice: Subject to any disclaimer, the term of this patent is extended or adjusted under 35 U.S.C. 154(b) by 0 days.

(21) Appl. No.: 08/925,018

(22) Filed: Sep. 8, 1997

Related U.S. Application Data

(63) Continuation of application No. 08/732,940, filed on Oct. 17, 1996, now abandoned.

(51) Int. Cl.[7] .................................................. G11B 5/84
(52) U.S. Cl. ................................ 369/84; 369/34
(58) Field of Search ........................ 369/32, 36, 35, 369/34, 84, 58, 53

(56) References Cited

U.S. PATENT DOCUMENTS

| | | |
|---|---|---|
| 4,562,489 | 12/1985 | Gaskell et al. . |
| 4,571,645 * | 2/1986 | Johnson et al. ........................ 369/98 |
| 4,654,732 * | 3/1987 | Mesher .................................. 369/98 |
| 4,693,659 * | 9/1987 | Burke et al. .......................... 369/288 |
| 4,811,325 | 3/1989 | Sharples, Jr. et al. . |
| 4,947,273 * | 8/1990 | Benz ..................................... 360/98 |
| 4,972,398 * | 11/1990 | Wachi ................................... 369/58 |
| 5,033,038 | 7/1991 | Kobayashi et al. . |
| 5,036,503 | 7/1991 | Tomita . |
| 5,056,073 | 10/1991 | Fitzgerald et al. . |
| 5,099,465 | 3/1992 | Gieger et al. . |
| 5,101,388 | 3/1992 | Fushimi . |
| 5,148,403 | 9/1992 | Gardner . |
| 5,608,707 * | 3/1997 | Ogawa et al. ......................... 369/84 |
| 5,610,893 * | 3/1997 | Soga ..................................... 369/84 |
| 5,640,535 * | 6/1997 | Suzuki et al. ......................... 369/84 |

FOREIGN PATENT DOCUMENTS

| | | | |
|---|---|---|---|
| 61-278083 * | 12/1986 | (JP) | ..................................... 369/84 |
| 1-130358 * | 5/1989 | (JP) | ..................................... 369/84 |
| 2-83882 * | 3/1990 | (JP) | ..................................... 369/84 |
| 3-269865 * | 12/1991 | (JP) | ..................................... 369/84 |
| 4-268276 * | 9/1992 | (JP) | ..................................... 369/84 |

* cited by examiner

Primary Examiner—Nabil Hindi
(74) Attorney, Agent, or Firm—Richard Esty Peterson Patent Attorney

(57) ABSTRACT

A system for the duplication of binary data onto caddy-loaded recordable disks, the system including a copy unit, a host computer and computer software, the computer software being installed in the host computer to provide a user interface and to direct the transfer of data from the host computer to the copy unit, the copy unit including a gravity-fed hopper holding a stack of caddy-loaded recordable disks, a caddy transport unit, a recordable disk drive, and a microprocessor. Caddies containing blank compact disks placed fed into the gravity-fed hopper and are transported to the recordable disk drive by the caddy transport unit for copying. After copying, each copied compact disk is inspected for errors and transported by the caddy transport unit to an accept or reject bin.

20 Claims, 4 Drawing Sheets

PROGRAMMABLE SELF-OPERATING CADDY-LOADED COMPACT DISK DUPLICATION SYSTEM

This application is a continuation of Ser. No. 08/732,940, filed Oct. 17, 1996, now abandoned.

BACKGROUND OF THE INVENTION

Digital compact disks were originally conceived in the early 1980's as a technique to accurately copy and preserve audio recordings intended for sale to a mass market of consumers. As computing power has increased exponentially since that time, information processing tasks unthinkable only a few years ago have become commonplace and require large amounts of data most economically and conveniently stored on digital compact disks.

Until recently the transfer of data onto compact digital disks was a costly procedure economically feasible only when manufacturing a large quantity of copies. Users whose applications required relatively few copies or required frequent data updates could not reap the benefits of this technology, even though low-cost disk-readers were readily available.

The advent of recordable digital compact disks, generally referred to as "CD-R" disks, was intended to allow users to record their own disks and thereby achieve significant savings. Unlike a common compact disk that has been pressed by a mold, a CD-R has a dye layer that is etched by a laser contained in the CD-R disk drive. Once etched, the "burned" CD-R disk is unalterable and will retain data for approximately 75 years.

Despite their overall durability, compact disks are still prone to damage caused by improper handling. A compact disk is especially susceptible to surface scratches large enough to defeat the disk's internal error correction coding. Disks that are subject to large amounts of the physical handling, either manually by humans or automatically by computer systems, are most vulnerable.

Compact disk users now avoid this problem through use of disk caddies that protect the compact disk while allowing an input or output device access to the surface of the disk. The standard caddy somewhat resembles a 3.25 inch floppy disk case enlarged to the size of a audio compact disk "jewel box". Similar to a floppy disk case, the caddy has a spring-loaded metallic sleeve that protects a section of the open face of the compact disk. Once inserted into a caddy-compatible disk read/write unit, the metallic sleeve is pushed away and input/output operations may be performed on the compact disk.

Conventional CD-R copiers generally lack the ability to handle recordable disks that have been pre-loaded into caddies. In this situation, users must manually remove all caddies before loading the CD-R copier and then reinstall all caddies after completion of copying, increasing the likelihood of damage to the compact disks created by careless handling.

Added to this expense in a volume copying process is the necessity for direct human supervision to prepare CD-R disks for copying, remove the disks from the CD-R disk writer once copying is complete, and then prepare the disks for inspection to ensure no defective disks are retained in the completed set of copies. Aside from the tedium involved that may indirectly add errors, requiring human attention in this process adds a significant labor cost that is added to the end-user price.

Finally, conventional CD-R copiers may include additional hardware necessary to protect compact disks from damage during transport through the CD-R copier. A CD-R copier that accepts caddies can make use of simpler, more efficient design and still produce perfect copies.

This system copies a stack of caddy-loaded recordable disks and eliminates the necessity of direct human supervision of the copy process, through an efficient caddy transport mechanism that minimizes moving parts and is inexpensive to manufacture. Another benefit provided by the open design of the caddy transport mechanism is that in the unlikely event the caddy transport mechanism becomes inoperable, users may easily troubleshoot and fix the mechanism.

Yet another benefit provided by this system is the system's ability to test burned disks for disk write errors, and through use of a separator ramp, discharge a caddy containing a defective disk into a defect bin, thus isolating the defective disks from the set of properly burned disks.

Yet another benefit provided by this system is the system's ability to automatically transfer data located on disks in several caddies to a host computer connected to the copy unit. This process is easily accomplished by loading the caddies containing the source data into the gravity-fed hopper and programming the system to read the source data off of the compact disks held by the caddies and then transfer the source data to the hard-disk drive of the host computer connected to the copy unit.

SUMMARY OF THE INVENTION

The programmable, automatic caddy-loaded compact disk duplication system of this invention includes a copy unit, a host computer, and computer software. The host computer and computer software provide an interface allowing the user to pre-program the copy unit to perform a completely unattended copy and data verification operation upon blank CD-R disks held in caddies and pre-loaded into the copy unit.

While not required for operation of the duplication system, it is preferred that the duplication system use an IBM PC-clone running a DOS or Windows operating system so that users need not purchase custom computer hardware to operate the duplication system. Hardware-specific computer components necessary to describe the duplication system will reference IBM PC and Windows specifications; however the duplication system is not intended to remain limited to these specifications and a designer skilled in the art would be able to translate these specifications into hardware and software equivalents for systems using Apple, UNIX, or IBM protocols.

The copy unit has a gravity-fed hopper holding a stack of caddy-loaded recordable disks, a caddy transport unit, a recordable disk drive, and a microprocessor.

The gravity-fed hopper is a square-shaped chute placed on the top of the copy unit and sized to hold 30 or more caddies, with each caddy containing a recordable compact disk. The user arranges a horizontal stack of caddies with the read/write side of the recordable disks located face down, and places the stack into the gravity-fed hopper.

In the preferred embodiment, the copy unit may also be used to transfer data from the compact disks loaded in the caddies and placed in the gravity-fed hopper into the host computer connected to the copy unit. This process is accomplished through additional instructions programmed into the computer software and the microprocessor to read the disks. No mechanical modifications to the copy unit are required.

The caddy transport unit comprises an actuator mechanism, a caddy shuttle, and an output separator. The actuator mechanism has a drive motor, a carriage, a separator finger and an insert finger.

The copy/read process begins when the separator finger removes the bottom caddy from the gravity-fed hopper and places the caddy on the caddy shuttle. The caddy shuttle then transports the caddy towards an input/output caddy receptacle on the recordable disk drive and is then inserted into the input/output caddy receptacle by the insert finger.

The insert finger is held in place by a tension spring that acts as a force limiter to prevent a misloaded caddy from damaging the recordable disk drive. If this occurs, a photocell sensor placed along the input/output caddy receptacle sends an electrical signal to the microprocessor indicating a misloaded caddy and the system shuts down.

When the system is configured to transfer data from caddy-loaded compact disks, the recordable disk drive reads data from the compact disk inserted in the recordable disk drive, and when completed the caddy is ejected onto the caddy shuttle and is transported away from the recordable disk drive. A separator ramp that makes contact with the caddy shuttle allows the caddy to slide down the separator ramp into a bin. Then the separator finger engages the next caddy in the gravity-fed hopper, and the disk load and data transfer processes repeats.

When the system is configured to copy data onto recordable disks, the caddy transport process includes extra steps to separate caddies containing correctly copied recordable disks from caddies containing incorrectly copied recordable disks.

After the recordable disk drive transfers data onto the recordable disk held by the caddy, the resulting disk is examined for errors. The caddy containing the disk is then ejected out of the recordable disk drive onto the caddy shuttle and is transported away from the recordable disk drive.

Separation of caddies containing correctly copied burned disks from caddies containing incorrectly copied burned disks is accomplished by a separator solenoid connected to the separator ramp. When the copy unit has checked and identified a caddy containing a defective disk, the separator solenoid pivots the separator ramp away from the caddy shuttle, causing the caddy to fall into a reject bin located beneath the end of the caddy shuttle.

The recordable disk drive sends and receives binary data with the computer software via a standard 50-pin SCSI connection between the recordable disk drive and the host computer. The initial loading of a caddy in the recordable disk drive is accomplished when the caddy is pushed into the input/output caddy receptacle of the recordable disk drive by-the insert finger.

A standard feature of the recordable disk drive is an internal sensor that senses the presence of a caddy and then completes the loading of the caddy into the input/output caddy receptacle. Once the recordable disk drive has loaded the caddy and verified the loading process, the recordable disk drive sends an electrical confirmation signal to the host computer. Once the confirmation signal is received by the host computer, the host computer then sends electrical signals back to the recordable disk drive to commence the disk reading or writing process.

The user may configure the system to test each burned disk for write errors. In this configuration, the host computer sends an electrical signal back to the recordable disk drive after the write operation is complete. This signal instructs the recordable disk drive to read the data off of the burned disk and compares it to the master file.

If the computer detects no disparity between the master file and the data read off of the burned disk, the computer sends a set of electrical signals to the copy unit directing the recordable disk drive to eject the caddy onto the caddy shuttle for transport down the separator ramp into the accept bin.

If the computer detects any disparity between the master file and the data read off of the burned disk, the computer sends another set of electrical signals to the copy unit directing the recordable disk drive to eject the caddy onto the caddy shuttle, raise the separator ramp, and transport the burned disk into the reject bin.

The microprocessor is an internal control unit for the copy unit and is electrically connected to the host computer, the and the CD-R disk drive head. In the preferred embodiment, a 8031 microprocessor is used, but any 8-bit microprocessor capable of processing a command set no less than 20 commands could be used.

The microprocessor monitors sensors, controls motors that transport the caddies, controls a LCD display located on the copy unit, and communicates with the host computer. The microprocessor receives user input generated by the computer software that is executed on the host computer. The user input is processed by the computer software into a set of ASCII commands sent to the microprocessor via a SCSI interface. The ASCII command set used is a variant of the Trace Mountain protocol that is often used to interface software to hardware copy devices. Commands sent by the computer software to the microprocessor consist of one letter or one letter and two digits.

In the preferred embodiment, an optional RS-232 interface is provided for compatibility with prior versions of computer software. The use of the SCSI interface is preferred as it provides the following benefits that are not possible with an RS-232 interface: (1) a one-cable connection between the copy unit and the host computer that transfers data, copy unit commands, and status flags; (2) the ability of the host computer to drive up to seven copy units using only one cable; and (3) cross-platform compatibility with any host platform that provides the standard application program interface to the SCSI interface.

Depending on the command sent by the computer software, the microprocessor will transmit back to the computer software a "ready" indication, an echo of the command received, or a status indication that command received was successfully or unsuccessfully executed. This status indication is then interpreted by the computer software into user readable information displayed on the host computer's video output display.

No particular type of host computer is necessary to support the copy unit and the computer software. A conventional personal computer equipped with a SCSI throughput interface and a hard disk drive capable of retaining an image of the master data will suffice.

In the preferred embodiment, the computer software necessary to direct the data transfer operations is written in the C programming language running under a DOS or Windows operating system. However, the computer software could be written using any computer language and operating system compatible with the computer used, as long as Trace Mountain- type protocols are available to the programmer.

These and other features will become apparent from a consideration of the Detailed Description of the Preferred Embodiments.

BRIEF DESCRIPTION OP THE DRAWINGS

Figure 3A:
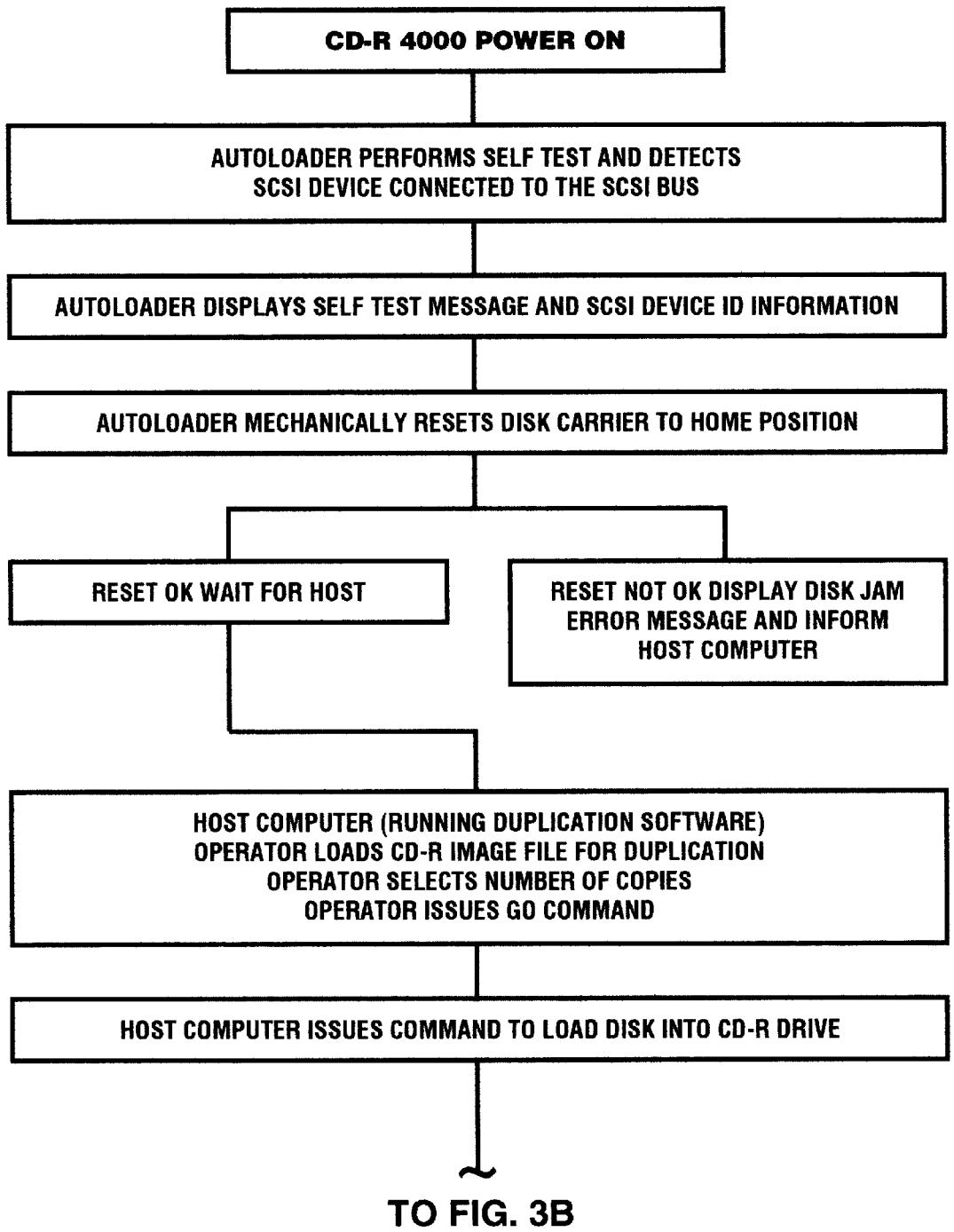
Figure 3B:
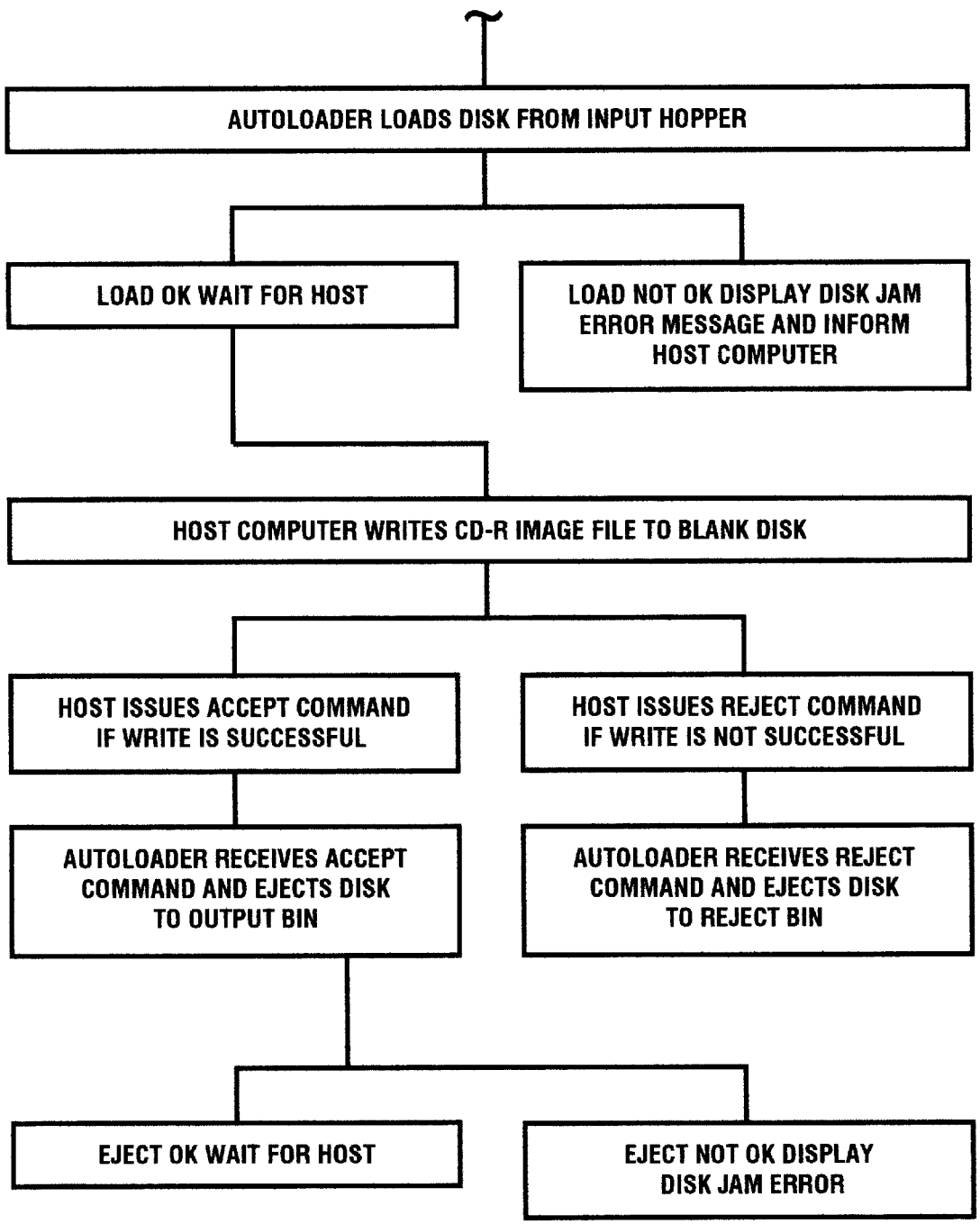

FIGS. 3A–B is a flow-chart illustration of the logic used by the host computer and microprocessor to transfer data and status flags from the host computer to the microprocessor and the recordable disk drive.

DETAILED DESCRIPTION OF THE PREFERRED EMBODIMENTS

Figure 1:
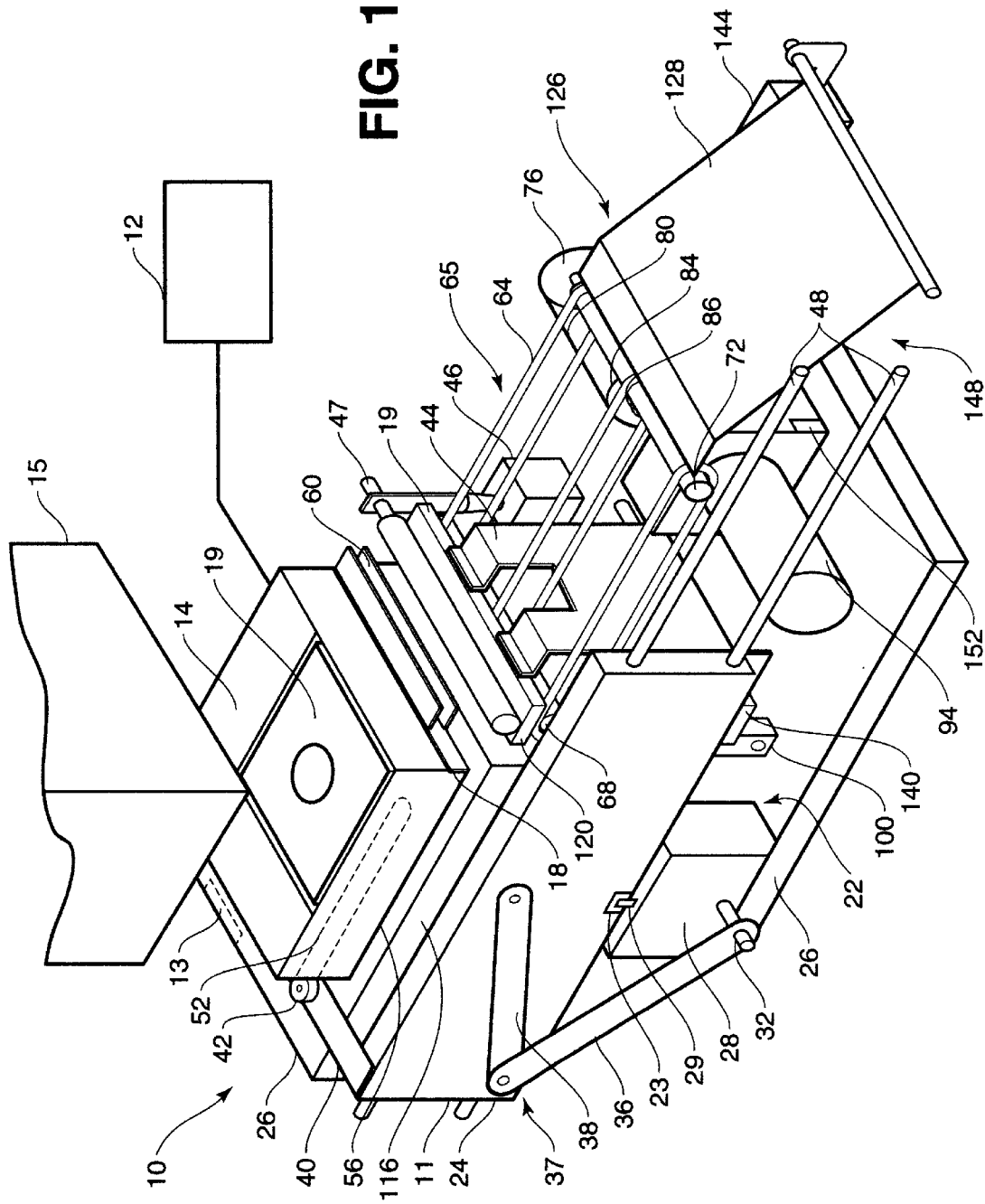
FIG. 1 is a front perspective view of the copy unit with the outer cover removed, illustrating the mechanical relationships among several components located on the copy unit.

Referring to FIG. 1, the compact disk duplication system designated generally by the reference numeral 10, includes a disk copy unit 11 and a host computer 12, here shown schematically. It is to be understood that the host computer 12, may be a conventional personal computer connected to the disk copy unit 11, or incorporated internally within the copy unit 11. A housing 26 (shown in cut-away) forms a base and side walls enclosing the copy unit 11.

The copy unit 11 includes a gravity-fed hopper 14 for holding a stack of compact disk caddies 19, (one shown in FIG. 1), an actuator mechanism 22 for displacing the bottom caddy from the hopper stack 15 to a caddy shuttle 65, and a recordable disk drive 116 that receives the caddy from the caddy shuttle for copying. On completion of the copying process, the caddy is ejected by the recordable disk drive 116 to the caddy shuttle 65 and carried by the shuttle 65 to an output separator 126. A microprocessor 13 is located inside the copy unit 11 is electrically connected to the host computer 12, the recordable disk drive 116, the caddy shuttle 65, and the output separator 126.

The actuator mechanism 22 has a carriage 24, a carriage motor 28, a carriage motor axle 32, a two-link pivot arm 37, a separator finger 40, and an insert finger 44. The carriage motor 28 rotates the carriage motor axle 32 in a clockwise direction, moving the carriage away from the recordable disk drive 116. To return the carriage 24, the carriage motor 28 reverses direction. The carriage motor 28 halts when a slot 23 on the carriage 24 passes over a photocell sensor 29 located on the housing 26. One end of the first pivot link 36 is affixed to the carriage motor axle 32 and the other end is pivotally connected to the second pivot link 38. The other end of the second pivot link 38 is affixed to the carriage 24.

The carriage 24 moves horizontally forward and backward along two carriage guide members 48 that are affixed to the housing 26 of the copy unit 20. One end of the separator finger 40 is affixed to the rear of the top face of the carriage 24 and a finger guide 42 is affixed to the other end of the separator finger 40.

A slot between the bottom face 18 of the gravity-fed hopper 14 and the top face 56 allows the separator finger 40 to travel underneath the bottom of the gravity-fed hopper 14 as the carriage 24 moves along the carriage guide members 48. An aperture 52 in the gravity-fed hopper 14 allows the finger guide 42 to travel inside the volume enclosed by the gravity-fed hopper 14, the finger guide 42 making contact with the caddy 19 located on the bottom face 18 of the gravity-fed hopper 14.

Each caddy 19 loaded into the gravity-fed hopper 14 is ejected out of the gravity-fed hopper 14 by the finger guide 42 and passes through the aperture guides 60 protruding from the gravity-fed hopper 14. Once fully ejected, the caddy is positioned on the caddy shuttle that has three caddy shuttle belt members 64 arranged in parallel, forming a transport surface supporting the caddy 19.

Each caddy shuttle belt member 64 winds around a rear roller 68 and a driving roller 72 and rotates around both roller members when the driving roller 72 is engaged to rotate about its longitudinal axis. Connected to one end of the driving roller 72 is a first wheel member 76. A drive belt 80 winds around the first wheel member 76 and a second wheel member 84. The second wheel member 84 is affixed to an axle 88 of a insert/eject motor 94. When engaged, the insert/eject motor 94 rotates the axle 88, causing the second wheel member 84, the drive belt 80 and the first wheel member 76 to rotate. This rotational motion is transferred to the driving roller 72.

Once a caddy 19 is ejected by the recordable disk drive, a solenoid 46 powered by the microprocessor 13, causes a pinch roller 47 to drop down and exert pressure on the caddy 19 placed on the caddy shuttle belt members 64. This pressure increases the friction between the caddy shuttle belt members 64 and the caddy 19, and the caddy 19 is transported away from the gravity-fed hopper 14.

Figure 2:
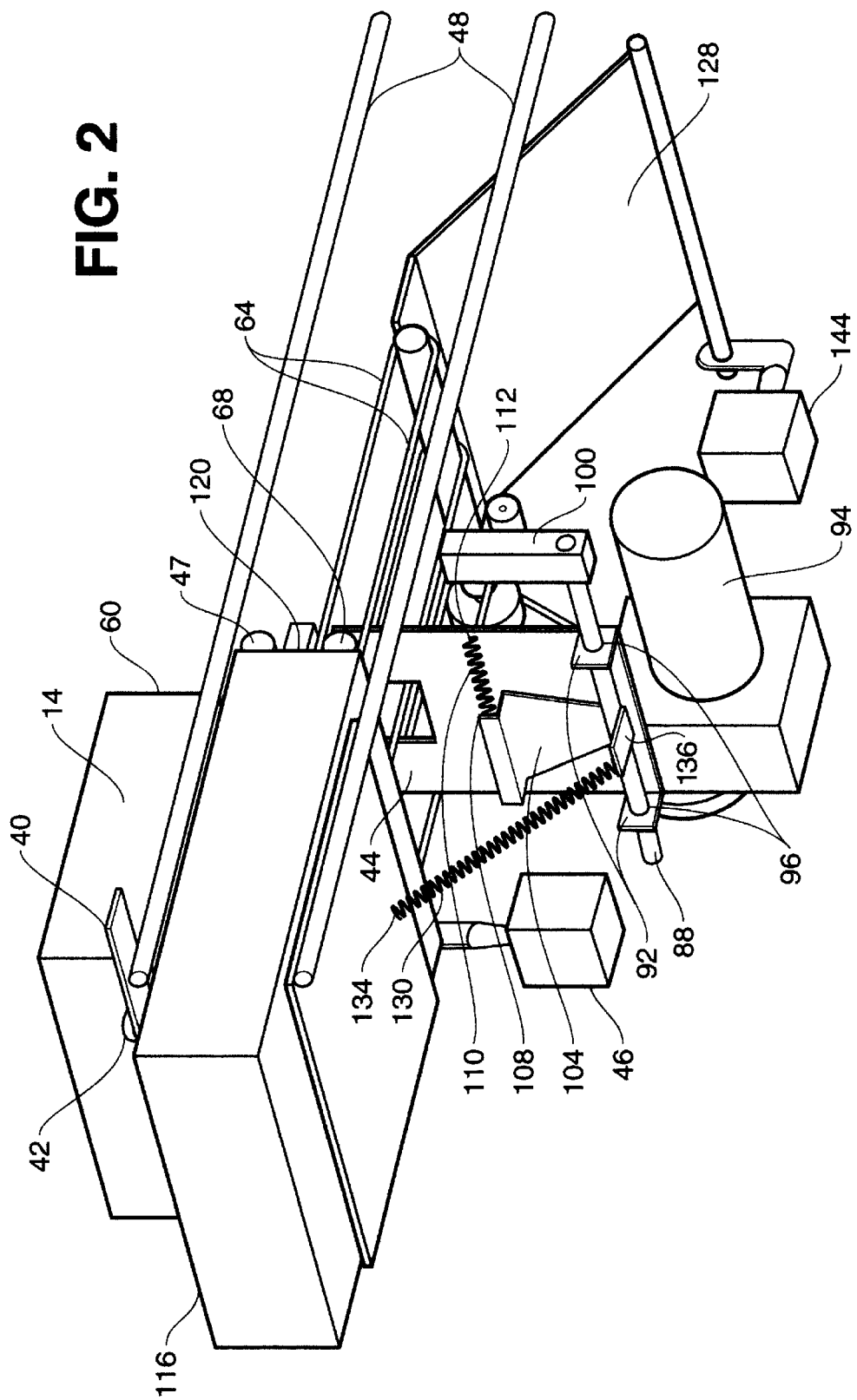
FIG. 2 is a side view of the main copy assembly with the outer cover removed.

The insert finger 44 is connected to the front side of the copy unit 10 and the connection is illustrated in FIG. 2 and described further below. An axle 88 that is pivotally mounted to the housing 26 is placed parallel to the bottom edge of the insert finger 44. A latch 100 is mounted perpendicularly to one end of the axle 88. Two tab members 92 perpendicular to the insert finger 44 are connected to the bottom corners of the insert finger 44. The axle 88 passes through an aperture 96 in each tab member 92, indicating the copy process was unsuccessful, prior to the transport of the caddy 19 towards the disk separator 128, the microprocessor 13 will engage a solenoid 144 that pivots the bottom edge of the disk separator ramp 128, thus raising the top face of the disk separator ramp 128 away from end of the caddy shuttle members 64. Instead of being transported into the disk separator ramp 128, the caddy 19 will fall off the edge of the caddy shuttle members 64 into a reject region 148. A sensor 152 will detect the motion of the caddy 19 into the reject region 148 and transmit a signal back to the microprocessor 13 if no caddy 19 is detected, indicating that the caddy 19 failed to enter the reject region 148 and that the copy unit 11 may be jammed.

A guide 104 is affixed to the axle 88 with its lateral axis parallel to the latch 100, such that movement of the latch 100 causes the axle 88 to rotate and the guide 104 to pivot parallel to the latch 100. One end 108 of a first spring member 110 is affixed to the wall of the guide 104 and the other end 112 is affixed to the wall of the insert finger 44. The compression factor of the first spring member 110 is selected such that the tension in the first spring member 110 pulls the face of the insert finger 44 to make contact with the face of the guide 104, causing the insert finger 44 to pivot parallel to the pivoting motion of the latch 100.

One end 134 of a second spring member 130 is affixed to the bottom face of the recordable disk drive 116 and the other end 136 is affixed to the bottom wall of the guide 104. The tension created by the second spring member 130 causes the latch 100 to maintain an equilibrium position approximately 30 degrees past vertical.

Located in the copy unit 10 behind the insert finger 44 and directly underneath the gravity-fed hopper 14 is a recordable disk drive 116 having an input/output caddy receptacle 120 beneath and parallel to the aperture 60 protruding from the gravity-fed hopper 14. A sensor 124 is placed next to the input/output caddy receptacle 120 and sends an electrical signal to the microprocessor 13 to indicate the presence of a caddy that is partially inserted in the input/output caddy receptacle 120.

The size and placement of the axle 88 and insert finger 44 is selected such that the top edge of the insert finger 44 is horizontal with the input/output caddy receptacle 120 when the insert finger 44 is vertical.

This parallel pivoting motion is maintained when a caddy sits on top of the caddy shuttle belt members 64 so that counter-clockwise movement of the latch 100 causes the top edge of the insert finger 44 to push the caddy 19 into the input/output caddy receptacle 120 in normal operation when the recordable disk drive 116 is empty and the caddy 19 on the caddy shuttle belt members 64 is properly aligned to enter the input/output caddy receptacle 120. The latch 100 pivots counter-clockwise when a tab 140 on the bottom of the carriage 24 engages the latch 100 on the return stroke of the carriage 24.

However, if the caddy 19 is not properly aligned or the recordable disk drive 116 is not empty, the caddy 19 cannot fully enter the input/output caddy receptacle 120. When this occurs, the resistance felt by the insert finger 44 causes the first spring member 110 to stretch, preventing the insert finger 44 from jamming the caddy 19 into the input/output caddy receptacle 120 as the latch 100 and guide 104 rotate towards the recordable disk drive 116.

In the preferred embodiment, the user may configure the system to inspect copied disks for disk write errors. When configured to verify the copied data, the recordable disk drive 116 reads the data off of the copied disk and transfers the data to the memory of the host computer 12. The host computer 12 compares the data transferred from the copied disk to the master data, and then sends an electrical signal back to the microprocessor 13 indicating whether the copy process was successful.

The microprocessor 13 then directs the input/output caddy receptacle 120 of the recordable disk drive 116 to eject the caddy 19 onto the caddy shuttle members 64. The insert/eject motor is engaged, and the caddy 19 is transported away from the recordable disk drive 116 by the movement of the caddy shuttle members 64.

Located adjacent to the end of the caddy shuttle members 64 opposite the recordable disk drive 116 is a an output separator 126 having a disk separator ramp 128. In the normal operating position of the disk separator ramp 128, the rear edge of the horizontal face of the disk separator ramp 128 lies approximately on the plane formed by the surface of the caddy shuttle members 64. The top face of the disk separator ramp 128 angles downward at a distance from the rear edge of the horizontal face of the disk separator ramp 128 selected so that a caddy 19 transported by the caddy shuttle members 64 onto the rear edge of the horizontal face of the horizontal face of the disk separator ramp 128 will slide down the length of the disk separator ramp 128 into a bin or other caddy collection device.

If the host computer 12 has sent the microprocessor 13 a signal indicating the copy process was successful, the caddy 19 will be transported out of the copy unit 11 in the manner described above. However, if the host computer 12 has sent a signal indicating the copy process was unsuccessful, prior to the transport of the caddy 19 towards the disk separator ramp 128, the microprocessor 13 will engage a solenoid 144 that pivots the bottom edge of the disk separator ramp 128, thus raising the top face of the disk separator ramp 128 away from the end of the caddy shuttle members 64. Instead of being transported onto the disk separator ramp 128, the caddy 19 will fall off the edge of the caddy shuttle members 64 into a reject region 148. A sensor 152 will detect the motion of the caddy 19 into the reject region 148 and transmit a signal back to the microprocessor 13 if no caddy 19 is detected, indicating that the caddy 19 failed to enter the reject region 148 and that the copy unit 11 may be jammed.

The schematic diagram of FIGS. 3A–B outlines the procedures for routing the disk and caddy from the hopper to the disk separator ramp.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. Copying apparatus for recordable compact disks, the apparatus including a processor with memory storage means for storing the information to be copied and an electronically connected copy unit the copy unit comprising:

a holding means for holding a plurality of recordable compact disks in a stack, each disk contained in a disk caddy, the stack having a lower-most disk and caddy;

a recordable disk drive located under the holding means having means for recording compact disks contained in a caddy installed in the disk drive and ejecting the disk and caddy from the disk drive under control of the processor;

a disk transport means for selectively displacing the lower-most disk and caddy from the holding means;

a disk shuttle means adjacent the recordable disk drive for receiving the disk and caddy displaced by the disk transport means, inserting the disk and caddy in the disk drive, receiving the disk and caddy on ejection of the disk and caddy from the disk drive and transporting the disk and caddy to a disk discharge means;

a disk insertion means cooperating with the shuttle means for inserting the disk and caddy in the disk drive;

disk discharge means for selectively discharging correctly copied disks contained in a caddy to a first discharge location and discharging incorrectly copied disks contained in a caddy to a second discharge location; and, control means cooperating with the processor for routing the recordable compact disks from the holding means to the disk shuttle means, to the disk drive and from the disk drive to the disk discharge means.

2. Copying apparatus for recordable compact disks, the apparatus including a processor with memory storage means for storing the information to be copied and an electronically connected copy unit, the copy unit comprising:

a holding means for holding one or more recordable compact disks each disk contained in a disk caddy the holding means having a lower-most disk and caddy;

a recordable disk drive located under the holding means having means for recording compact disks contained in a caddy installed in the disk drive and ejecting the disk and caddy from the disk drive under control of the processor;

a reciprocal disk transport means for selectively engaging a lower-most disk and caddy from the holding means and displacing the disk and caddy from the holding means;

a reciprocal disk shuttle means adjacent to the recordable disk drive for receiving the disk and caddy displaced by the disk transport means, inserting the disk and caddy in the disk drive, receiving the disk and caddy on ejection of the disk and caddy from the disk drive and transporting the disk and caddy to a disk discharge means;

a disk insertion means cooperating with the shuttle means for inserting the disk and caddy in the disk drive; and, control means cooperating with the processor for routing the recordable compact disks from the holding means to the disk drive and from the disk drive.

3. The copying apparatus of claim 2 wherein the apparatus includes a programmable computer electronically connected to the processor, the programmable computer having user interface means for allowing a user to select information to be copied on the recordable compact disks.

4. The copying apparatus of claim 3 wherein the user interface means includes display means for displaying the copy status during operation of the apparatus.

5. The copying apparatus of claim 4 wherein the disk holding means comprises a hopper, the caddies being horizontally orientated and vertically stacked inside the hopper, the stacked caddies having a lower-most caddy seated on, the disk transport means.

6. The copying apparatus of claim 5 wherein the disk transport means includes an electronic actuator means for displacing the lower-most caddy seated on the disk transport means.

7. The copying apparatus of claim 6 wherein the disk transport means has a separator finger arranged proximately to the lower-most caddy, the separator finger being connected to the electronic actuator means, the electronic actuator means displacing the separator finger against the lower-most caddy when the actuator is activated, wherein the lower-most caddy is displaced onto the disk shuttle means.

8. The copying apparatus of claim 2, wherein the disk shuttle means has an insert finger pivotally connected to the disk transport means, the insert finger being connected to a tab, wherein movement of the insert finger is effected by movement of the disk transport means against the tab, with the insert finger making contact with the lower-most caddy and inserting the lower-most caddy into the recordable disk drive.

9. The copying apparatus of claim 8 wherein the disk shuttle means has shuttle belt members, wherein a caddy with a recorded disk is ejected horizontally from the recordable disk drive onto the shuttle belt members.

10. The copying apparatus of claim 9 wherein the shuttle belt members are connected to a motor, the ejected caddy with the recorded disk being seated upon the shuttle belt members and upon activation of the motor, the caddy being transported away from the recordable disk drive.

11. Copying apparatus for recordable compact disks, the apparatus including a processor with memory storage means for storing the information to be copied and an electronically connected copy unit, the copy unit comprising:
  a holding means for holding one or more recordable compact disks each disk contained in a disk caddy the holding means having a lower-most disk and caddy;
  a recordable disk drive positioned directly below the holding means having means for recording compact disks contained in a caddy installed in the disk drive and ejecting the disk and caddy from the disk drive under control of the processor;
  a disk transport means for selectively displacing the lower-most disk and caddy from the holding means;
  a disk shuttle means adjacent the recordable disk drive for receiving the disk and caddy displaced by the disk transport means, inserting the disk and caddy in the disk drive, receiving the disk and caddy on ejection of the disk and caddy from the disk drive and transporting the disk and caddy to a disk discharge means;
  a disk insertion means cooperating with the shuttle means for inserting the disk and caddy in the disk drive;
  disk discharge means for selectively discharging correctly copied disks contained in a caddy to a first discharge location and discharging incorrectly copied disks contained in a caddy to a second discharge location; and,
  control means cooperating with the processor for routing the recordable compact disks from the holding means to the disk drive and from the disk drive to the disk discharge means.

12. The copying apparatus of claim 11 wherein the apparatus includes a programmable computer electronically connected to the processor, the programmable computer having user interface means for allowing a user to select information to be copied on the recordable compact disks.

13. The copying apparatus of claim 12 wherein the disk holding means comprises a hopper, the caddies being horizontally orientated and vertically stacked inside the hopper, the stacked caddies having a lower-most caddy seated on the disk transport means.

14. The copying apparatus of claim 13 wherein the disk transport means includes an electronic actuator means for displacing the lower-most caddy seated on the disk transport means.

15. The copying apparatus of claim 14 wherein the disk transport means has a separator finger arranged proximately to the lower-most caddy, the separator finger being connected to the electronic actuator means, the electronic actuator means displacing the separator finger against the lower-most caddy when the actuator is activated, wherein the lower-most caddy is displaced onto the disk shuttle means.

16. The copying apparatus of claim 15 wherein the disk shuttle means has an insert finger pivotally connected to the disk transport means, the insert finger being connected to a tab, wherein movement of the insert finger is effected by movement of the disk transport means against the tab, with the insert finger making contact with the lower-most caddy and inserting the lower-most caddy into the recordable disk drive.

17. The copying apparatus of claim 16 wherein the disk shuttle means has shuttle belt members, wherein a caddy with a recorded disk is ejected horizontally from the recordable disk drive onto the shuttle belt members.

18. The copying apparatus of claim 17 wherein the shuttle belt members are connected to a motor, the ejected caddy with the recorded disk being seated upon the shuttle belt members and upon activation of the motor, the caddy being transported away from the recordable disk drive and onto the disk discharge means.

19. The copying apparatus of claim 18 wherein the disk discharge means has a pivoting disk separator ramp, the pivoting disk separator ramp being electrically connected to the processor,
  wherein upon the successful completion of a disk copy operation, the top face of the pivoting disk separator ramp shuttle is seated alongside the end of shuttle belt members, the shuttle belt members transporting the caddy down the pivoting disk separator ramp; and
  wherein upon the unsuccessful completion of a disk copy operation, the pivoting disk separator ramp pivots away from the shuttle belt members, the shuttle belt members transporting the caddy into a reject region located under the pivoting disk separator ramp.

20. The copying apparatus of claim 11 wherein the processor includes means for directing the recordable disk drive to read information from a caddy having a disk containing the information to be copied and copy all or part of the information to subsequent caddies loaded with blank recordable compact disks.

* * * * *